United States Patent Office 3,193,553
Patented July 6, 1965

3,193,553
HYDRAZINO AND HYDRAZONO CHLORO-PYRIDAZONES
Franz Reicheneder and Karl Dury, Ludwigshafen (Rhine), Adolf Fischer, Mutterstadt, Pfalz, and Herbert Stummeyer, Limburgerhof, Pfalz, Germany, assignors to Badische Anilin- & Soda-Fabrik Aktiengesellschaft, Ludwigshafen (Rhine), Germany
No Drawing. Filed July 13, 1964, Ser. No. 382,411
Claims priority, application Germany, Nov. 17, 1961, B 64,828
6 Claims. (Cl. 260—250)

This application is a continuation-in-part of our co-pending application Serial No. 234,238, filed October 30, 1962.

It is known to use pyridazone derivatives to influence plant growth. Known compounds for this purpose have the disadvantage, however, that a considerable period elapses after their use before their effect becomes evident.

We have now found that agents which contain a pyridazone of the general formula:

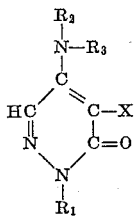

in which X denotes a halogen atom, especially a chlorine atom, $R_1$ denotes a substituted or unsubstituted alkyl, phenyl or cycloalkyl radical, $R_2$ denotes a hydrogen atom or an alkyl radical, $R_3$ denotes a linear or branched alkinyl group, a substituted or unsubstituted nitrogen-containing heterocyclic radical or a substituted or unsubstituted amino radical, or $R_2$ and $R_3$ together denote the radical $=N\equiv N$ or

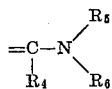

in which $R_4$ denotes a hydrogen atom or a substituted or unsubstituted alkyl or aryl radical, and $R_5$ and $R_6$ denote hydrogen atoms or substituted or unsubstituted alkyl or aryl radicals, $R_5$ and $R_6$ being identical or different, and in which $R_4$ and $R_5$ together with the carbon and nitrogen atoms of which they are substituents may form a heterocyclic ring, or which contain a salt of such a pyridazone, are free from the said disadvantage.

By salts we understand generally salts of inorganic or organic acids, especially strong acids, i.e. acids with high dissociation constants, for example mineral acids, such as hydrochloric acid, sulfuric acid, phosphoric acid, hydrobromic acid, or organic acids, for example formic acid or acetic acid.

The agents according to this invention have the advantage that they can more easily be emulsified in water than known agents. Furthermore, in the case of the salts, they lend themselves for use in the form of their aqueous solutions because they have good solubility in water.

The agents have good selectivity in respect of weeds among cultivated plants, for example onions or sugar beet, and take effect rapidly, i.e. only a short time after their use. Furthermore their after-effect in the soil is of short duration. Rapid crop rotation is therefore possible. The agents according to this invention may also be used in suitable dosage for the total destruction or inhibition of undesired plant growth. For this purpose they may be used in amounts of about 1 to 10 kg. of active ingredient per hectare.

Agents according to this invention may furthermore be used to achieve other influences on plant growth, especially for dehydration, acceleration of ripening by premature desiccation, for example in potatoe crops, and also for reducing fruit setting, retarding blossoming, and prolonging the harvest period and storage life.

The agents according to this invention may also be used in suitable concentrations as shoot promoting and root promoting agents.

The new pyridazone derivatives to be used according to this invention may be prepared by methods analogous to conventional methods. For example, reaction of 1-phenyl-4,5-dichloropyridazone (or the 1-lower alkyl or 1-cycloalkyl-4,5-dichloropyridazone) with sodium azide according to the general reaction described by Theodor Curtius, Berichte der deutschen chemischen Gesellshaft, 55, 1565 (1922), in a suitable solvent, e.g. alcohols, in particular ethanol, dimethylformamide or dimethylsulfoxide. yields 1-phenyl-4-azido-5-chloropyridazone-(6) (melting point 110° to 111° C.) or the corresponding 1-lower alkyl or 1-cycloalkyl compound. Analogous reaction of said dichloropyridazones with hydrazine hydrate according to the general reaction described by E. Meyer, Berichte der deutschen chemischen Gesellschaft, 33, 1885 (1900), in a suitable solvent, e.g., alcohols, in particular ethanol, dimethylformamide or dimethylsulfoxide, yields the 1-phenyl-4-hydrazino-5-chloropyridazone-(6) (melting point 172° C. with decomposition) or the corresponding 1-lower alkyl or 1-cycloalkyl compound. The aforesaid hydrazino compounds yield with nitrous acid in a suitable solvent, e.g., an aqueous acid solution, e.g., dilute hydrochloric acid or dilute sulfuric acid the corresponding azide according to the general reaction described by Theodor Curtius, Berichte der deutschen chemischen Gesellschaft, 23, 3029 (1890), or with ketones, e.g., acetone or methyl ethyl ketone, the corresponding hydrazones. The above compounds may be used as herbicides in the form of the hydrochloride or hydrobromide salts.

A typical preparation of 1-phenyl-4-azido-5-chloropyridazone-(6) or the corresponding 1-methyl or 1-cyclohexyl compound is the reaction of sodium azide in aqueous solution with 1-phenyl (or 1-methyl or 1-cyclohexyl)-4,5-dichloropyridazone-(6) in alcohols, in particular ethanol, dimethylformamide or dimethylsulfoxide at about 60° to 70° C.

Another typical preparation is the reaction of nitrous acid with the 1-phenyl (or 1-methyl or 1-cyclohexyl)-4-hydrazino-5-chloropyridazone-(6) at about 20° to 30° C. in an aqueous acid solution, e.g., dilute hydrochloric acid or dilute sulfuric acid. The hydrazino compound may be derived from the aforesaid 4,5-dichloropyridazone-(6) by reaction with hydrazine hydrate at about 60° C. in alcohols, in particular ethanol, dimethylformamide or dimethylsulfoxide.

A typical preparation of the acetone-4-[1-phenyl-5-chloropyridazone-(6)-yl-]hydrazone or the methyl-ethyl-ketone - 4 - [1 - phenyl - 5 - chloropyridazone - (6) - yl-] hydrazone, is the reaction of acetone or methyl ethyl ketone with one of the above hydrazino compounds at about 60° to 80° C., said acetone or methyl ethyl ketone being used in excess.

A typical preparation of 1-phenyl-4-hydrazino-5-chloropyridazone-(6) or the corresponding 1-methyl or 1-cyclohexyl compound is the reaction of hydrazine hydrate with 1-phenyl (or 1-methyl or 1-cyclohexyl)-4,5-dichloropyridazone-(6) in alcohols, in particular ethanol, dimethylformamide or dimethylsulfoxide at about 60° C.

The following are examples of compounds which may be used according to this invention:

1-phenyl-4-hydrazino-5-chloropyridazone, melting point 172° C. (with decomposition)

1-phenyl-4-hydrazino-5-chloropyridazone hydrochloride, melting point 150° C. (with decomposition)

acetone-4-[1-phenyl-5-chloropyridazone - (6) - yl]-hydrazone, melting point 120° to 121° C.

methyl-ethyl-ketone-4-[1-phenyl - 5 - chloropyridazone-(6)-yl]-hydrazone, melting point 107° to 109° C.

methyl-ethyl-ketone-4-[1-phenyl - 5 - chloropyridazone-(6)-yl]-hydrazone hydrochloride, melting point 135° to 137° C.

1-cyclohexyl-4-hydrazino-5-chloropyridazone-(6), melting point 148° C. (decomposition)

1-methyl - 4-hydrazino-5-chloropyridazone - (6), melting point 153° C. (decomposition).

The form in which the agents according to this invention are used depends entirely on the particular application. The following for example are suitable: solutions of the salts in water, these salts being either salts of physiologically inert acids or salts of acids which themselves have a phytotoxic effect; the free compounds may also be used as emulsions, suspensions or solutions in water or organic liquids, for example high boiling range mineral oil fractions or chlorohydrocarbons. The range of applications may be widened by adding substances having bactericidal, fungicidal or plant growth influencing properties, and also by combination with fertilizers.

The invention is illustrated by, but not limited to, the following examples.

Example 1

Soil is treated at the rate of 3 and 5 kg. per hectare with N-[4-(1-phenyl-5-chloropyridazone - (6) - yl-]N'-dimethyl-formamidine. The active substance is sprayed on the soil as an aqueous dispersion which has been prepared with an addition of a dispersing agent (sodium lignin sulfonate). Seeds of *Sinapis alba* (mustard), *Avena fatua* (wild oats), *Poa annua* (rye grass), *Beta vulgaris* (sugar beet), *Galium aparine* (cleavers), *Allium cepa* (onion), *Daucus carota* (carrots) are sown in the soil thus pretreated. At first the plants develop normally.

Six days later most of the plants begin to blanch from the tips of the leaves. After another three weeks, *Sinapis alba, Avena fatua, Poa annua,* and *Galium aparine* are practically completely withered. *Beta vulgaris* shows no damage whereas *Allium cepa* is only slightly blanched at the leaf tips.

Salts of the above formamidine, and also 1-phenyl-5-chloro-4-(N-methyl - 2-pyrrolidin-imino)-pyridazone-(6) or its salts or 1-phenyl-4-azido-5-chloro-pyridazone-(6), acetone-4-[1-phenyl-5-chloropyridazone-(6)-yl] - hydrazone, methyl-ethyl-ketone - 4 - [1-phenyl-5-chloro-pyridazone-(6)-yl]-hydrazone or 1-phenyl-4-hydrazino-5-chloropyridazone-(6) have a similar action.

What we claim is:

1. A compound selected from the group consisting of a compound having the formula

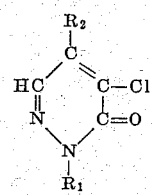

wherein, in said formula, $R_1$ represents a member selected from the group consisting of lower alkyl, phenyl and cyclohexyl, and $R_2$ represents a member selected from the group consisting of —N=NH, acetone hydrazone and methyl ethyl ketone hydrazone, and the hydrochloride and hydrobromide salts thereof.

2. 1-phenyl-4-hydrazino-5-chloropyridazone-(6).
3. 1-methyl-4-hydrazino-5-chloropyridazone-(6).
4. 1-cyclohexyl-4-hydrazino-5-chloropyridazone-(6).
5. Acetone-4-[1-phenyl - 5 - chloropyridazone-(6)-yl]-hydrazone.
6. Methyl-ethyl-ketone - 4-[1 - phenyl-5-chloropyridazone-(6)-yl]-hydrazone.

No references cited.

NICHOLAS S. RIZZO, *Primary Examiner.*